US011865500B2

(12) United States Patent
Shu et al.

(10) Patent No.: US 11,865,500 B2
(45) Date of Patent: Jan. 9, 2024

(54) INSTANT DISSOLVING DEVICE BY MASS TRANSFER AND STRETCHING WITH A CLEANING STRUCTURE AND A DISSOLVING METHOD THEREOF

(71) Applicants: Southwest Petroleum University, Chengdu (CN); Chengdu Technological University, Chengdu (CN)

(72) Inventors: Zheng Shu, Chengdu (CN); Zhongbin Ye, Chengdu (CN); Leiting Shi, Chengdu (CN); Xiao Shu, Chengdu (CN); Yalan Yang, Chengdu (CN); Yong Qi, Chengdu (CN); Hongqiao Liu, Chengdu (CN)

(73) Assignees: Southwest Petroleum University;, Chengdu (CN); Chengdu Technological University, Chengdu (CN)

( * ) Notice: Subject to any disclaimer, the term of this patent is extended or adjusted under 35 U.S.C. 154(b) by 0 days.

(21) Appl. No.: 18/301,224

(22) Filed: Apr. 15, 2023

(65) Prior Publication Data

US 2023/0330606 A1 Oct. 19, 2023

(30) Foreign Application Priority Data

Apr. 18, 2022 (CN) ......................... 202210405477.2

(51) Int. Cl.
*B01F 21/10* (2022.01)
*B01F 27/93* (2022.01)
(Continued)

(52) U.S. Cl.
CPC .............. *B01F 21/10* (2022.01); *B01F 27/93* (2022.01); *B01F 33/83613* (2022.01); *B01F 2101/2805* (2022.01); *E21B 43/16* (2013.01)

(58) Field of Classification Search
CPC .... B01F 21/10; B01F 27/93; B01F 33/83613; B01F 2101/2805; B01F 27/73; E21B 43/16
(Continued)

(56) References Cited

U.S. PATENT DOCUMENTS 2,740,696 A * 4/1956 Longwell .................. C07C 2/18 422/135
2,855,156 A * 10/1958 David ...................... B01F 27/93 241/46.11
(Continued)

FOREIGN PATENT DOCUMENTS

CN 103143276 A 6/2013
CN 109351219 A 2/2019
(Continued)

*Primary Examiner* — Charles Cooley
(74) *Attorney, Agent, or Firm* — Nitin Kaushik

(57) ABSTRACT

Disclosed are an instant dissolving device by mass transfer and stretching with a cleaning structure and a dissolving method thereof. The dissolving device consists of a liquid inlet, a stretching repetition unit and a mass transfer unit, the stretching unit is sequentially composed of an upper fixed fluted disc, a movable fluted disc and a lower fixed fluted disc all with a plurality of through holes, and the upper fixed fluted disc and the lower fixed fluted disc are fixed to the dissolving device housing; the polymer gel solution is formed into a "uniform" solution after passing through the mass transfer unit. The dissolving device in the present invention is easy to install, and achieves instant dissolution of the polymers and improves the dissolution efficiency through the joint action of forced stretching and mass transfer by high gravity.

7 Claims, 8 Drawing Sheets

(51) Int. Cl.
*B01F 33/80* (2022.01)
*B01F 101/00* (2022.01)
*E21B 43/16* (2006.01)

(58) Field of Classification Search
USPC .................................................. 366/315–317
See application file for complete search history.

(56) References Cited

U.S. PATENT DOCUMENTS

| | | | | | |
|---|---|---|---|---|---|
| 3,134,549 | A * | 5/1964 | Quackenbush | B02C 17/16 | 241/74 |
| 3,844,490 | A * | 10/1974 | Schold | B02C 17/16 | 241/74 |
| 4,106,116 | A * | 8/1978 | MacKay | B01F 27/93 | 366/144 |
| 5,061,456 | A * | 10/1991 | Brazelton | B01F 23/43 | 422/135 |
| 5,252,635 | A * | 10/1993 | Brazelton | B01F 23/43 | 523/334 |
| 10,406,491 | B2 * | 9/2019 | Lee | B01F 23/53 | |
| 2016/0059194 | A1 * | 3/2016 | Smith | B01F 25/3121 | 366/108 |
| 2019/0031793 | A1 * | 1/2019 | Smith | B01F 27/192 | |

FOREIGN PATENT DOCUMENTS

| | | | | | |
|---|---|---|---|---|---|
| CN | 110860250 | A | | 3/2020 | |
| WO | WO-9426402 | A1 | * | 11/1994 | B01F 15/00889 |

* cited by examiner

INSTANT DISSOLVING DEVICE BY MASS TRANSFER AND STRETCHING WITH A CLEANING STRUCTURE AND A DISSOLVING METHOD THEREOF

CROSS-REFERENCE TO RELATED APPLICATIONS

The application claims priority to Chinese patent application No. 202210405477.2, filed on Apr. 18, 2022, the entire contents of which are incorporated herein by reference.

TECHNICAL FIELD

The present invention pertains to a rapid polymer dissolving method, in particular to an instant dissolving device by mass transfer and stretching with a cleaning structure and a dissolving method thereof.

DESCRIPTION OF PRIOR ART

As one of the important methods for enhanced oil recovery in oilfield development, polymer flooding has been widely applied to onshore oilfields at home and abroad. However, the injected water is highly mineralized and contains a lot of calcium and magnesium ions due to the lack of fresh water resources in offshore oilfields. The traditional partially hydrolyzed polyacrylamide has low salt resistance and low viscosity, failing to meet the requirements of offshore oil fields. With a small number of hydrophobic groups on its main chain, the solution of hydrophobically associating polymer is characterized with reversible three-dimensional mesh structure, sound shearing dilutability and injectability, strong shear resistance, and high viscosity. It is highly viscous in highly mineralized water containing a lot of calcium and magnesium ions, and suitable for application in offshore oilfield where there is a lack of freshwater resources. The advantages of hydrophobically associating polymer are more prominent in reservoirs with high formation permeability and high crude oil viscosity. Too long time required for mixing and curing of hydrophobically associating polymers at room temperature (20° C. to 25° C.) restricts its application in offshore oilfields greatly. Therefore, aiming at the actual mine conditions of offshore oilfields, the study of accelerating the dissolution velocity of hydrophobically associating polymer is of great significance for polymer-based technologies to enhance the oil recovery of offshore oilfields.

Currently, the solubility of hydrophobically associating polymers has been studied, and it takes over 120 min to dissolve the hydrophobically associating polymers with existing methods, which means that a significant number of large curing tanks are required to ensure the complete dissolution of the polymers and that it is almost impossible to apply polymer flooding for offshore platforms with limited space and load-bearing capacity, especially for existing small offshore platforms.

The Online Quick Dissolution Research Group of the Enhanced Oil Recovery Laboratory of Southwest Petroleum University has proposed an idea of setting up screens or orifice plates of different apertures with appropriate spacing inside the pipeline to strip and cut swelling particles, reduce the particle size of swelling particles, and shorten the dissolution time, and demonstrated the feasibility of this idea. In 2006, a field amplification test was conducted, in which a cyclic approach was adopted to strip and cut the swelling polymer particles several times, resulting in a significant reduction in the polymer dissolution time. However, the repeated cutting of polymer molecular chains led to chain breakage and solution viscosity reduction; meanwhile, the swelling particles blocked the screens or orifice plates, which cannot meet the requirements of polymer preparation and injection on offshore platforms. Therefore, it is badly in need of an instant hydrophobically associating polymer dissolving device with simple structure and convenient operation to accelerate the dissolution velocity and shorten the dissolution time of the hydrophobically associating polymer, making its solution suitable for field application.

The purpose of the present invention is to provide a device for accelerating the swelling particle dissolution of hydrophobically associating polymers that can achieve on-site docking, with such advantages as simple installation, small floor area, light weight and high processing capacity.

SUMMARY OF THE INVENTION

In view of this, it is the purpose of the present invention to provide an instant dissolving device by mass transfer and stretching with a cleaning structure and a dissolving method thereof, wherein the device consists of a liquid inlet, a stretching repetition unit and a mass transfer unit; the stretching unit is sequentially composed of an upper fixed fluted disc, a movable fluted disc and a lower fixed fluted disc all with a plurality of through holes; the upper fixed fluted disc and the lower fixed fluted disc are fixed to the dissolving device housing; the surface of the upper and lower fixed fluted discs close to the movable fluted disc is of a short tooth structure, and is evenly engaged with the short tooth structure on both sides of the movable fluted disc; the stretching unit is repeatedly set from top to bottom in series, and also provided with a transmission shaft and a motor; a cleaning structure is set below the stretching unit and a mass transfer unit is set around the periphery of the stretching unit; the mass transfer unit comprises an inner ring and an outer ring that can rotate reversely around the same axis; the polymer gel is formed into a “uniform” solution after passing through the mass transfer unit. The dissolving device in the present invention is easy to install, and achieves instant dissolution of the polymers and improves the dissolution efficiency through the joint action of forced stretching and mass transfer by high gravity.

To achieve the above purpose, the following technical solutions were used:

An instant dissolving device by mass transfer and stretching with a cleaning structure consists of a housing, a liquid inlet, a stretching repetition unit, a mass transfer unit, a cleaning unit and a liquid outlet; the stretching repetition unit, the mass transfer unit and the cleaning unit are arranged inside the device housing, and the liquid inlet and outlet are provided on the housing; the polymer solution flowing from the stretching unit or the mass transfer unit is connected to the polymer outlet provided in the lower part of the mass transfer unit through a channel;

The stretching repetition unit is sequentially composed of an upper fixed fluted disc, a movable fluted disc and a lower fixed fluted disc all with a plurality of through holes; the upper fixed fluted disc and the lower fixed fluted disc are fixed to the transmission shaft or the dissolving device housing; the surface of the upper fixed fluted disc and the lower fixed fluted disc close to the movable fluted disc is of a short tooth structure, and is evenly engaged with the short tooth structure on both sides of the movable fluted disc; the diameter of the fixed fluted disc is not greater than the diameter of the movable fluted disc, and the stretching repetition unit is repeated in series from top to bottom, and also provided with a transmission shaft and a motor; the number of stretching repetition units is defined as n (n≥1);

A cleaning unit is arranged below the stretching unit and connected with the transmission shaft, and rotates in opposite direction of with the movable fluted disc of the stretching unit through a coaxial reverser to clean the polymer gel layer adhered to the lower fixed fluted disc; the cleaning unit is arranged below each stretching repetition unit or below the entire stretching unit, and the bottom plate of the mass transfer unit is kept a certain distance from the lower fixed fluted disc, so as to store the polymer gel solution scraped off by the cleaning unit;

A mass transfer unit is arranged around the periphery of the stretching unit; the polymer enters the mass transfer unit after being processed by the stretching unit; the mass transfer unit is composed of k layer(s) of mass transfer ring (k≥1); the polymer solution passes through the porous material provided on the mass transfer ring for transfer by penetrating and flows out of the mass transfer ring which is connected with, separated from, or combined with the stretching unit; the mass transfer ring is movably arranged on the device housing, the transmission shaft of the stretching unit, or the transmission shaft or the external motor:

If connected with the stretching unit, the mass transfer ring is directly connected to the outer ring wall of the upper and lower fixed fluted discs of the stretching unit, forming an integrated cylinder with the stretching unit, and the mass transfer ring is kept stationary as the upper and lower fixed fluted discs;

If set apart from the stretching unit, the mass transfer ring is rotated by a coaxial reverser or a separate motor in the axis of the transmission shaft of the stretching unit; the adjacent mass transfer rings all rotate in the opposite direction, and the innermost separated mass transfer ring rotates in the opposite direction with the movable fluted disc of the stretching unit; a bottom plate is arranged under the mass transfer ring, and a spacing is left horizontally between adjacent mass transfer rings, so that the polymer is pulled in the opposite direction in different mass transfer rings;

If set in combination with the stretching unit, the mass transfer ring is first directly connected to the outer ring wall of the upper and lower fixed fluted discs of the stretching unit, forming an integrated cylinder with the stretching unit; the mass transfer ring is kept stationary as the upper and lower fixed fluted discs, and the rest separated mass transfer rings are set apart from the stretching unit and rotated by a coaxial reverser or a separate motor in the axis of the transmission shaft of the stretching unit; the adjacent separated mass transfer rings all rotate in the opposite direction, and the innermost separated mass transfer ring rotates in the opposite direction to the movable fluted disc of the stretching unit; a bottom plate is arranged under the speared mass transfer ring, and a space is left in the horizontal direction between adjacent mass transfer rings, so that the polymer is pulled in the opposite direction in different mass transfer rings;

In order to reduce the volume while improving the reliability of the device, the mass transfer ring is set apart from the tension unit can be fixed in extreme cases.

Further, the movable fluted disc is of a short tooth structure, and the short tooth is 3 to 5 cm in length, and the short tooth surface is designed with circular transition.

Further, the short tooth structure of the movable fluted disc and the lower fixed fluted disc is in a tooth shape, and the stretching unit is repeatedly arranged in series from top to bottom; the transmission shaft is connected to the movable fluted disc, and the motor drives the movable fluted disc to rotate; the engagement gap between the upper fixed fluted disc and the movable fluted disc and between the movable fluted disc and the lower fixed fluted disc in each mass transfer unit is gradually reduced from top to bottom.

Further, a liquid inlet is added to the interval between the stretching repetition units in order to meet greater liquid dispensing requirement.

Further, the liquid inlet is connected with the stretching repetition unit, the liquid inlet is arranged on the upper part of the stretching unit, and the liquid outlet is arranged on the lower part of the housing; the transmission shaft is connected to the upper motor outside the housing.

Further, the porous material is sand particle with different meshes, metal foam with different pore sizes, screen meshes with different pore sizes, or one or more of the cellulose;

Further, if k is 1, the mass transfer ring is a single layer, and directly connected to the outer ring walls of the upper and lower fluted discs of the stretching unit, forming an integrated cylinder with the stretching unit, that is, the mass transfer ring is fixed to the outer ring walls of the upper and lower fixed fluted discs of the stretching unit; at this time, the mass transfer ring rotates in the same direction as the movable fluted discs of the stretching unit.

Further, if k is 2, the mass transfer ring includes inner and outer rings, and the mass transfer ring is separated from the stretching unit; the mass transfer ring is rotated by a coaxial reverser or a separate motor in the axis of the transmission shaft of the stretching unit; the inner ring of mass transfer ring is rotated by a coaxial reverser or a separate motor in the opposite direction with the movable fluted disc of the stretching unit; the outer ring is rotated reversely by a coaxial reverser or a separate motor; a bottom plate is arranged under the mass transfer ring, and a space is left in the horizontal direction between adjacent mass transfer rings, so that the polymer is pulled in the opposite direction in different mass transfer rings.

Further, if k is 3, the mass transfer ring is set in combination with the stretching unit and is divided into a fixed ring, an inner separated ring and an outer separated ring; the fixed ring is directly connected with the outer ring walls of the upper and lower fixed fluted discs of the stretching unit, forming an integrated cylinder with the stretching unit, that is, the mass transfer ring is fixed on the outer ring walls of the upper and lower fixed fluted discs of the stretching unit; at this time, the fixed ring of the mass transfer ring rotates in the same direction as the movable fluted disc of the stretching unit; the inner separated ring and the outer separated ring are arranged separately; the separated mass transfer rings are rotated by a coaxial reverser or a separate motor in the axis of the transmission shaft of the stretching unit; the inner separated ring is rotated by a coaxial reverser or a separate motor in the opposite direction to the movable fluted disc of the stretching unit; the outer separated ring is rotated by a coaxial reverser or a separate motor in the opposite direction to the inner separated ring; a bottom plate is arranged under each separated mass transfer ring, and a spacing is left horizontally between adjacent mass transfer rings, so that the polymer is pulled in the opposite direction in different mass transfer rings.

Further, the cleaning unit is a crosswise blade with a wave shape or serrated structure.

An instant dissolving method by mass transfer and stretching with a cleaning structure is described as follows:

Firstly, start the motors of the device to drive the mass transfer rings of the stretching unit, cleaning unit and mass transfer unit to rotate; pump in a mixture of dry polymer powder and water from the liquid inlet; the undissolved polymer mixed solution enters the upper part of the stretching unit from the liquid inlet for stretching; the solution passes through the stretching repetition unit and enters the upper fixed fluted disc and movable fluted disc from the through holes on the upper fixed fluted disc, and then flows from the movable fluted disc into the lower fixed fluted disc; due to the short tooth structure of the upper fixed fluted disc, the movable fluted disc and the lower fixed fluted disc, the short tooth structure of the movable fluted disc and the lower fixed fluted disc is in a tooth shape, and the stretching repetition units are repeatedly arranged in series from top to bottom; the engagement gap between the upper fixed fluted disc and the movable fluted disc and between the movable fluted disc and the lower fixed fluted disc in each stretching unit is gradually reduced from top to bottom, the movable fluted disc runs at a certain speed, the swelling polymer particles are ground by the short teeth, then sheared again by the tangential force generated in the stretching unit under the centrifugal force, and centrifuged to the mass transfer ring of the mass transfer unit:

When the mass transfer ring is connected with the stretching unit, the polymer is forced to pass through the mass transfer ring, then penetrates the porous materials of the mass transfer ring and flows out of the mass transfer ring; the liquid comes out from the side of the mass transfer ring, then is connected to the outlet of the device, and discharged from the device to form a dissolved "uniform" polymer solution;

When the mass transfer ring is set apart from the stretching unit, driven by the rotation of the rotating fluted disc, the incompletely dissolved polymer particles are thrown out in the radial direction under the action of centrifugal force, then pass through the mass transfer ring set on the innermost ring under the action of hyper-gravity centrifugation, and encounter the second ring that rotates in the opposition direction of the innermost ring in the spacing cavity between the innermost ring and the second ring; the polymer is forcibly pulled back and forth when the second ring rotates reversely to make the polymer molecular chain segments exposed and extended rapidly, and then passes through the second mass transfer ring and counter-rotates in the spacing cavity between the second and third rings; the gel polymer is forcibly pulled back and forth to make the polymer molecular chain segments extended rapidly, and then passes through the mass transfer ring set on the third ring under the high gravity generated by the rotation of the third ring, until it passes through all mass transfer rings; the liquid comes from the side of the mass transfer ring, and is discharged from the device to form a dissolved "uniform" polymer solution.

When the mass transfer ring is set in combination with the stretching unit, the polymer is treated by the stretching unit and then forced to pass through the mass transfer ring, penetrate the porous materials of the mass transfer ring, and flow out the mass transfer ring into the innermost ring that is set apart; the polymer passes through the porous material set on the innermost ring under the action of hyper-gravity centrifugation; due to the reverse rotation in the spacing cavity between the innermost ring and the second ring, the polymer is forcibly pulled back and forth to make the polymer molecular chain segments extended rapidly, then comes to and penetrate the second ring under the action of high gravity; the gel polymer is forcibly pulled back and forth between the second and third mass transfer rings to make the polymer molecular chain segments extended rapidly and transfer the mass out of the third mass transfer ring, until it passes through all mass transfer rings; the liquid comes from the side of the mass transfer ring, and discharged from the device to form a dissolved "uniform" polymer solution;

When the mass transfer rings separately set are fixed, the polymer is forced to flow out from the mass transfer ring after passing through the stretching unit.

Beneficial Effects

The present invention has the following beneficial effects:

The device can quickly dissolve polymers, especially for hydrophobically associating polymers. The unique association strengthens the interaction between their molecular chains. The device provides a combination form of forced stretching, mass transfer and stripping, greatly increasing the contact area between polymer and water, so as to achieve instant dissolution. Moreover, it is advantaged by high injection capacity to meet on-site demand, small floor area, low load, and high safety in installation and operation.

DETAILED DESCRIPTION OF THE PREFERRED EMBODIMENTS

In order to make the purpose, technical solutions and advantages of the present invention more clearly understood, the following is a further detailed description of the invention in conjunction with the embodiments and accompanying drawings. It is to be understood that the preferred embodiments described herein are only used to interpret the present invention and are not intended to limit the present invention.

The technical scheme of the invention is further explained with reference to the appended figures and the preferred embodiments.

Embodiment 1

In the technical scheme of the embodiment, two stretching repetition units are connected in series, that is, the two stretching repetition units are repeatedly set from top to bottom, that is, the number of repetition units is n=2. The working principle of the device with other number of stretching repetition units is similar, so it will not be described again herein.

The embodiment is mainly described by the case where there is 1 or 2 mass transfer rings in the mass transfer unit. The working principle of the device with other number of stretching repetition units is similar, so it will not be described again herein.

Other embodiments may be combined according to the following embodiments, all of which fall within the protection scope of the present invention.

Figure 1:
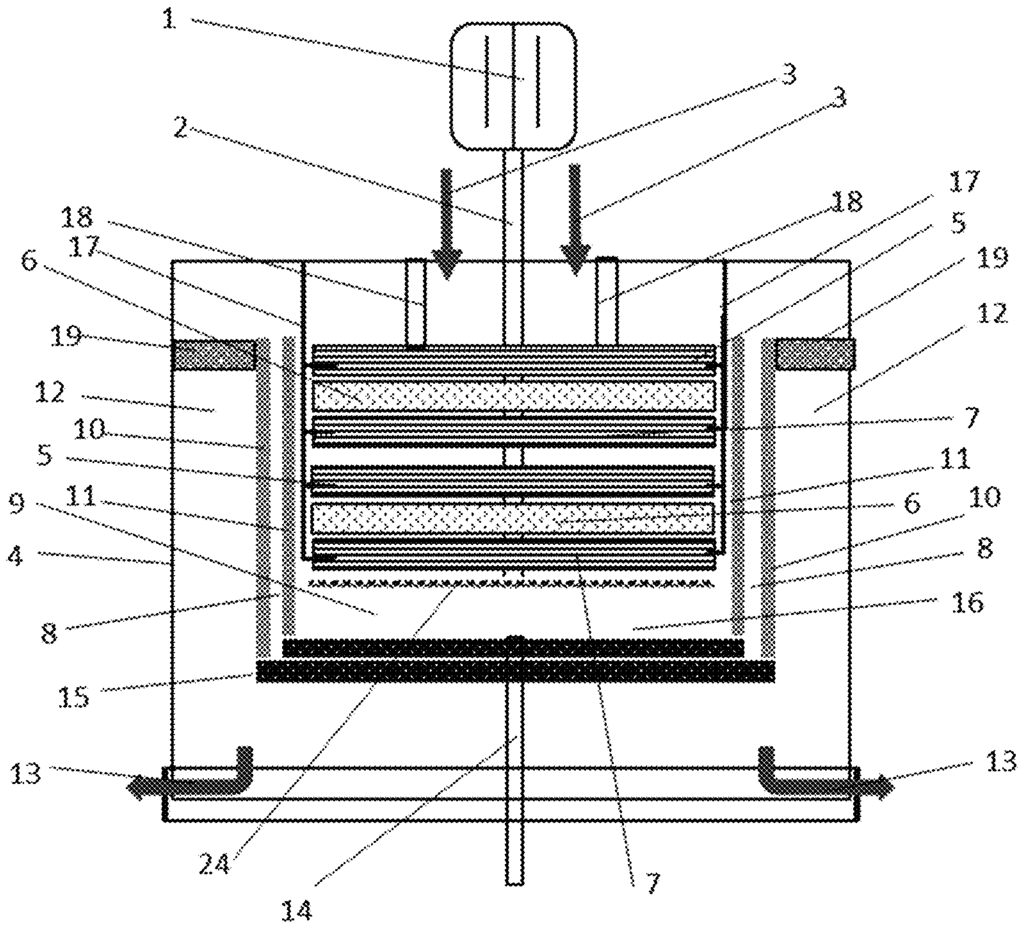
FIG. 1 is a structural diagram of the instant dissolving device by mass transfer and stretching with a cleaning structure in the embodiment of the present invention.

Embodiment 1: The Stretching Unit is Composed of Two Stretching Repetition Units in Series, and Two Mass Transfer Units are Set by Separation FIG. 1 shows a structure diagram of the present invention. An instant dissolving device by mass transfer and stretching with a cleaning structure consists of a liquid inlet (3), a stretching repetition unit and a mass transfer unit; the stretching unit is sequentially composed of an upper fixed fluted disc (5), a movable fluted disc (6) and a lower fixed fluted disc (7) all with a plurality of through holes; the upper fixed fluted disc (5) and the lower fixed fluted disc (7) are fixed to the dissolving device housing (4); the surface of the upper fixed fluted disc (5) and the lower fixed fluted disc (7) close to the movable fluted disc (6) is of a short tooth structure, and is evenly engaged with the short tooth structure on both sides of the movable fluted disc (6); the movable fluted disc (6) is connected with the transmission shaft (2) and driven to rotate by a motor (1). The stretching units are arranged and connected in series from top to bottom. The movable fluted disc (6) is connected with the transmission shaft (2) and driven to rotate by the motor (1). The stretching unit is provided with a liquid inlet (3) at the top and a liquid outlet (13) at the bottom, the upper fixed fluted disc (5) is fixed to the device housing (4) by a fixing rod (18), and the lower fixed fluted disc (7) is fixed on the device housing (4) by an another fixing rod (17). The stretching unit also includes a transmission shaft (2) and the motor (1), where in the transmission shaft (2) is connected to the movable fluted disc (6) and the motor (1) drives the movable fluted disc (6) to rotate. A cleaning unit (24) is arranged below the stretching unit and connected with the transmission shaft (2), and rotates in the opposite direction to the movable fluted disc (6) of the stretching unit through a coaxial reverser to remove the polymer gel adhering to the lower fixed fluted disc (7) and tangentially scrap off the polymer. A mass transfer unit is set around the periphery of the stretching unit, and composed of an inner ring (11) and an outer ring (10) that can rotate in reverse direction around the coaxial line.

In the first case: The inner ring (11) is driven to reversely rotate with the movable fluted disc (6) by a coaxial reverser (not shown) arranged on the transmission shaft (2), and the outer ring (10) is also driven to reversely rotate with the inner ring (11) by a coaxial reverser (not shown) arranged on the transmission shaft (2); at this time, there is only one motor for the stretching unit in the device;

In the second case: The inner ring (11) is driven to reversely rotate with the movable fluted disc (6) by a coaxial reverser (not shown) arranged on the transmission shaft (2), and the outer ring (10) is also driven to reversely rotate with the inner ring (11) by an external motor; at this time, the device is provided with two motors;

In the third case: The inner ring (11) is driven to reversely rotate with the movable fluted disc (6) by an external motor, and the outer ring (10) is driven to reversely rotate with the inner ring (11) by a coaxial reverser (not shown) arranged on the transmission shaft (2); at this time, the device is provided with two motors;

In the fourth case: The inner ring (11) is driven to reversely rotate with the movable fluted disc (6) by an external motor, and the outer ring (10) is driven to reversely rotate with the inner ring (11) by an external motor; at this time, the device is provided with three motors;

The inner ring (11) has a cavity (9) containing the polymer; the incompletely dissolved polymer particles are sheared by tangential force generated in the stretching unit. The stretching unit throws the ground polymer gel out to the mass transfer unit by centrifugal force. The polymer gel first enters the cavity (9) of inner ring (11). There is a polymer reverse pulling space (8) left between the inner ring (11) and the outer ring (10), and porous materials are arranged on the inner ring (11) and the outer ring (10). On the one hand, the polymer passes through the porous materials of the inner ring (11) and outer ring (10) for transfer by shearing. The ground polymer gel is thrown out from the stretching unit to the mass transfer unit by centrifugal force. The polymer gel first enters the cavity of the inner ring (11). There is a polymer reverse pulling space (8) between the inner ring and the outer ring, and porous materials provided inside the inner ring (11) and the outer ring (10). On the one hand, the polymer is stretched by the porous materials in the inner ring (11) and the outer ring (10). On the other hand, the polymer is forcibly pulled back and forth by the reverse rotation in the cavity (8) between the inner ring (11) and the outer ring (10), the polymer molecular chain segment is extended rapidly, and the polymer gel forms a "uniform" solution after passing through the mass transfer unit, and the solution is connected with the polymer outlet (13) set at the lower part of the mass transfer unit through the channel (12). A polymer inlet (3) is set at the upper part of the stretching unit. (15) is the outer ring bottom plate and (16) is the inner ring bottom plate. The inner ring bottom plate (16) has a certain distance from the lower fixed fluted disc (7) to store the polymer gel scraped off by the cleaning unit (24). When the inner ring (11) rotates, polymer gel is centrifuged by high gravity to pass through the inner and outer rings of the mass transfer unit, so to obtain a "uniform" solution.

When the inner ring (11) and outer ring (10) are driven to rotate by the external motor, (14) is the inner ring rotating transmission shaft and fixing rod, and the inner ring transmission shaft (14) is connected to external motor. A slide is set on the device housing and used to fix the outer ring (10) with the pivot points (19) that are arranged with equal spacing. The slide is driven by the motor to rotate along the housing (4), so as to drive the outer ring (10) to rotate reversely.

In another case, the inner ring (11) is driven by an external motor or coaxial reverser to rotate reversely with the stretching unit, and the outer ring (10) is fixed to the device housing with the fixing points. During operation, the outer ring (10) does not rotate, but the polymer in the cavity (8) between the inner ring (11) and the outer ring (10) is forcibly pulled back and forth after the rotation of the inner ring, the polymer molecular chain segment is rapidly extended and the polymer gel is formed into a "uniform" solution after passing through the mass transfer unit.

In order to reduce the volume while improving the reliability of the device, the mass transfer ring is set apart from the tension unit can be fixed in extreme cases. However, there will be loss in the amount of polymer solution.

A liquid inlet is added to the interval between the stretching repetition units in order to meet greater liquid dispensing requirement.

Dissolution method: Firstly, start the motors of the device to drive the movable fluted disc (6), cleaning unit and each mass transfer ring of mass transfer unit to rotate; pump a mixture of dry polymer powder and water from the liquid inlet (3); fill the aqueous solution of the incompletely dissolved polymer into each stretching unit from the liquid inlet (3) for stretching; the aqueous solution of the polymer sequentially enters the upper fixed fluted disc (5) and the movable fluted disc (6) from the through holes on the upper fixed fluted disc (5), and then enters the lower fixed fluted disc (7) from the movable fluted disc (6); due to the short tooth structure of the upper fixed fluted disc (5), the movable fluted disc (6) and the lower fixed fluted disc (7), the short tooth structure of the movable fluted disc (6) and the lower fixed fluted disc (7) is in a tooth shape, and the mass transfer repetition units are repeatedly arranged in series from top to bottom; the engagement gap between the upper fixed fluted disc (5) and the movable fluted disc (6) and between the movable fluted disc (6) and the lower fixed fluted disc (7) in each mass transfer unit is gradually reduced from top to bottom; the movable fluted disc (6) runs at a certain speed, and the incompletely dissolved polymer particles are crushed by the short tooth structure to form swelling particles with larger surface area; the swelling particles are centrifuged into the inner ring cavity (9) of the mass transfer unit by the centrifugal force of the stretching unit; driven by the rotation of the inner ring (11), the swelling polymer particles are thrown out in the radial direction under the action of hyper-gravity centrifugation, then pass through the porous material set on the inner ring (11) and encounter the outer ring (10) with reverse rotation which is set in the spacing cavity between inner ring (11) and outer ring (10); due to the reverse rotation of the outer ring (10), the polymer is forcibly pulled back and forth by the reverse rotation of the outer ring (10); the polymer molecular chain segments are rapidly stretched and continually centrifuged through the porous material set on the outer ring (10) under the high gravity generated by the outer ring rotation, and the liquid comes out from the side of the outer ring (10), then is connected to the outlet of the device, and discharged from the device to form a dissolved "uniform" polymer solution.

When the mass transfer rings separately set are fixed, the polymer is forced to flow out from the mass transfer ring after passing through the stretching unit.

Figure 2:
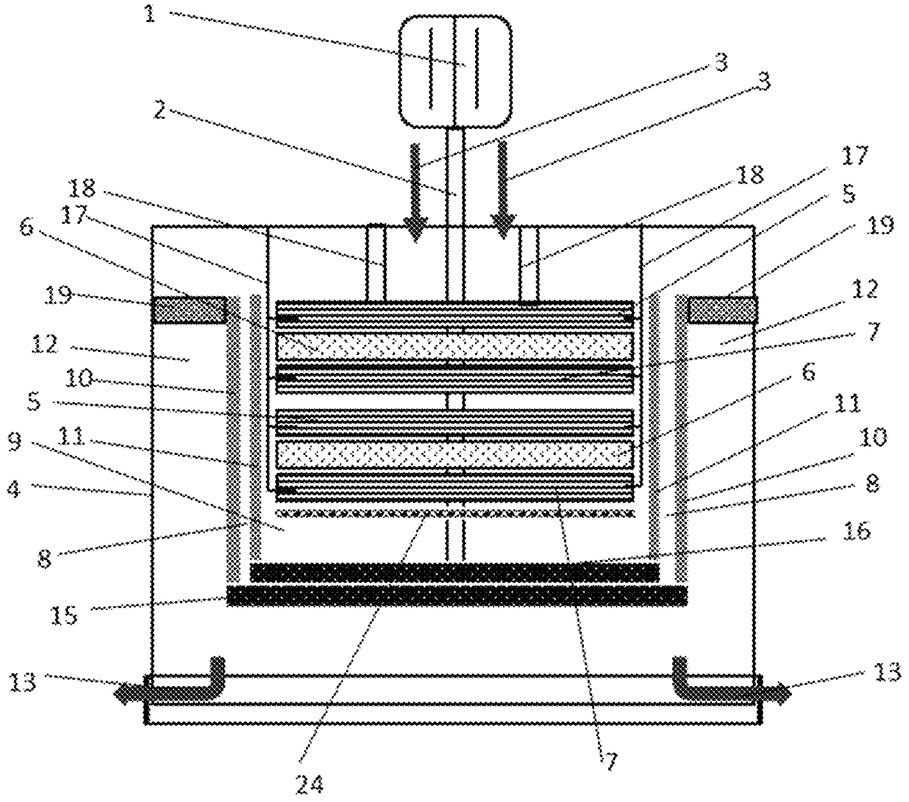
FIG. 2 is another structural diagram of the instant dissolving device by mass transfer and stretching with a cleaning structure in the embodiment of the present invention.

FIG. 2 shows another structure diagram of the present invention. An instant dissolving device by mass transfer and stretching with a cleaning structure consists of a liquid inlet (3), a stretching repetition unit and a mass transfer unit; the stretching unit is composed of an upper fixed fluted disc (5), a movable fluted disc (6) and a lower fixed fluted disc (7) all with a plurality of through holes; the upper fixed fluted disc (5) and the lower fixed fluted disc (7) are fixed to the dissolving device housing (4); the surface of the upper fixed fluted disc (5) and the lower fixed fluted disc (7) close to the movable fluted disc (6) is of a short tooth structure, and is evenly engaged with the short tooth structure on both sides of the movable fluted disc (6); the stretching repetition units are repeatedly set from top to bottom, the upper fixed fluted disc (5) is fixed to the device housing (4) by the fixing rod (18), and the lower fixed fluted disc (7) is fixed on the device housing (4) by the another fixing rod (17). The stretching unit also includes a transmission shaft (2) and the motor (1), where in the transmission shaft (2) is connected to the movable fluted disc (6) and the motor (1) drives the movable fluted disc (6) to rotate. A cleaning unit (24) is arranged below the stretching unit and connected with the transmission shaft (2), and rotates in the opposite direction to the movable fluted disc (6) of the stretching unit through a coaxial reverser to remove the polymer gel adhering to the lower fixed fluted disc (7) and tangentially scrap off the polymer. A mass transfer unit is set around the periphery of the stretching unit, and composed of an inner ring (11) and an outer ring (10) that can rotate in reverse direction around the coaxial line, and the inner ring (11) has a cavity (9) containing the polymer. The ground polymer gel is thrown out from the stretching unit to the mass transfer unit by centrifugal force. The polymer gel first enters the cavity of the inner ring (11). There is a polymer reverse pulling space (8) between the inner ring and the outer ring, and porous materials provided inside the inner ring (11) and the outer ring (10). On the one hand, the polymer is stretched by the porous materials in the inner ring (11) and the outer ring (10). On the other hand, the polymer is forcibly pulled back and forth by the reverse rotation in the cavity (8) between the inner ring (11) and the outer ring (10), the polymer molecular chain segment is extended rapidly, and the polymer gel forms a "uniform" solution after passing through the mass transfer unit, and the solution is connected with the polymer outlet (13) set at the lower part of the mass transfer unit through the channel (12). A polymer inlet (3) is set at the upper part of the stretching unit. (15) is the outer ring bottom plate and (16) is the inner ring bottom plate. The inner ring bottom plate (16) has a certain distance from the lower fixed fluted disc (7) to store the polymer gel scraped off by the cleaning unit (24). When the inner ring (11) rotates, polymer gel is centrifuged by high gravity to pass through the inner and outer rings of the mass transfer unit, so to obtain a "uniform" solution.

At this time, the inner ring (11) is driven to rotate by directly connecting the transmission shaft (2) and the motor (1), and the inner ring (11) is driven by the transmission shaft (2) to rotate in the opposite direction of the movable fluted disc (6) of the stretching unit through the coaxial reverser;

A slide is set on the device housing and used to fix the outer ring (10) with the pivot points (19) that are arranged with equal spacing. The slide is driven by the motor to rotate along the housing (4), so as to drive the outer ring (10) to rotate reversely. The outer ring is also driven to reversely rotate with the inner ring (11) by a coaxial reverser arranged on the transmission shaft (2).

In another case, the inner ring (11) is driven by an external motor or coaxial reverser to rotate reversely with the stretching unit, and the outer ring (10) is fixed to the device housing with the fixing points. During operation, the outer ring (10) does not rotate, but the polymer in the cavity (8) between the inner ring (11) and the outer ring (10) is forcibly pulled back and forth after the rotation of the inner ring, the polymer molecular chain segment is rapidly extended and the polymer gel is formed into a "uniform" solution after passing through the mass transfer unit.

A liquid inlet is added to the interval between the stretching repetition units in order to meet greater liquid dispensing requirement.

In use, firstly start the motors of the device to drive the movable fluted disc (6), cleaning unit and each mass transfer ring of mass transfer unit to rotate; pump a mixture of dry polymer powder and water from the liquid inlet (3); fill the aqueous solution of the incompletely dissolved polymer into each stretching unit from the liquid inlet (3) for stretching; the aqueous solution of the polymer sequentially enters the upper fixed fluted disc (5) and the movable fluted disc (6) from the through holes on the upper fixed fluted disc (5), and then enters the lower fixed fluted disc (7) from the movable fluted disc (6); due to the short tooth structure of the upper fixed fluted disc (5), the movable fluted disc (6) and the lower fixed fluted disc (7), the short tooth structure of the movable fluted disc (6) and the lower fixed fluted disc (7) is in a tooth shape, and the mass transfer repetition units are repeatedly arranged from top to bottom; the engagement gap between the upper fixed fluted disc (5) and the movable fluted disc (6) and between the movable fluted disc (6) and the lower fixed fluted disc (7) in each mass transfer unit is gradually reduced from top to bottom; the movable fluted disc (6) runs at a certain speed, and the incompletely dissolved polymer particles are crushed by the short tooth structure to form swelling particles with larger surface area; the swelling particles are centrifuged into the inner ring cavity (9) of the mass transfer unit by the centrifugal force of the stretching unit; driven by the rotation of the inner ring (11), the swelling polymer particles are thrown out in the radial direction under the action of hyper-gravity centrifugation, then pass through the porous material set on the inner ring (11) and encounters the outer ring (10) with reverse rotation which is set in the space (8) between inner ring (11) and outer ring (10); the swelling particles are pulled back and forth by the reverse rotation of the outer ring (10); the polymer molecular chain segments are rapidly stretched and continually centrifuged through the porous material set on the outer ring (10) under the high gravity generated by the outer ring rotation, and the liquid comes out from the side of the outer ring (10), then is connected to the outlet (13) of the device, and discharged from the device to form a dissolved "uniform" polymer solution.

When the mass transfer rings separately set are fixed, the polymer is forced to flow out from the mass transfer ring after passing through the stretching unit.

Figure 3:
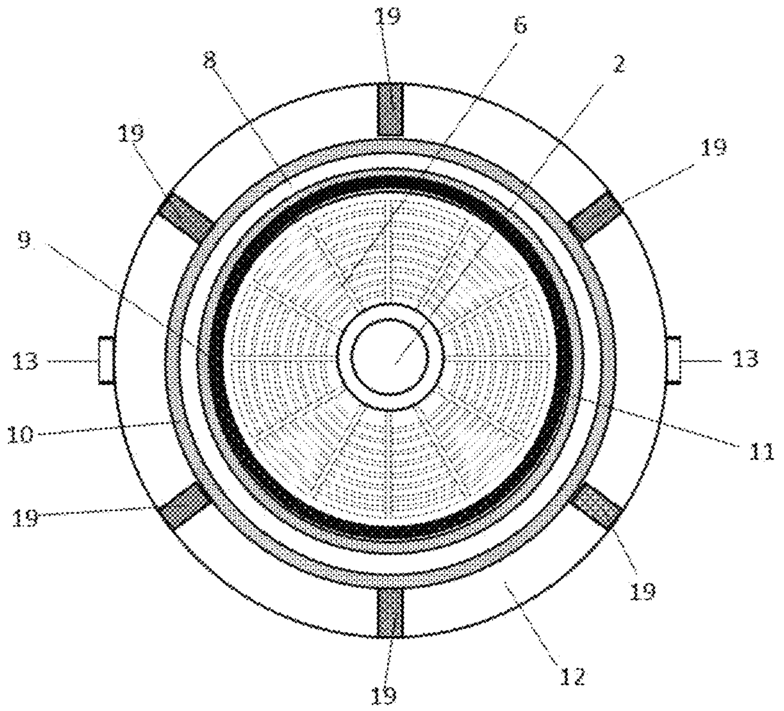
FIG. 3 is a top view of the instant dissolving device by mass transfer and stretching with a cleaning structure in the embodiment of the present invention (without the motor and fixing rod)

FIG. 3 shows the top view of the instant dissolving device by mass transfer and stretching with a cleaning structure (excluding the motor, fixing rod and upper fixed fluted disc). It can be seen that the stretching unit is symmetrically set with the transmission shaft (2), and after the upper fixed fluted disc is removed, (6) is the movable fluted disc. A mass transfer unit is set around the periphery of the stretching unit, and composed of an inner ring (11) and an outer ring (10) that can rotate in reverse direction around the coaxial line, and the inner ring (11) has a cavity (9) containing the polymer. The ground polymer gel is thrown out from the stretching unit to the mass transfer unit by centrifugal force. The polymer gel first enters the cavity of the inner ring (11). There is a polymer reverse pulling space (8) between the inner ring and the outer ring, and porous materials provided inside the inner ring (11) and the outer ring (10). On the one hand, the polymer is stretched by the porous materials in the inner ring (11) and the outer ring (10). On the other hand, the polymer is forcibly pulled back and forth by the reverse rotation in the cavity (8) between the inner ring (11) and the outer ring (10), the polymer molecular chain segment is extended rapidly, and the polymer gel forms a "uniform" solution after passing through the mass transfer unit. (19) is the pivot point between the outer ring and the housing slide, (13) is the polymer solution outlet, (12) is the polymer channel, and the polymer is connected through the channel (12) and the outlet (13).

Figure 4:
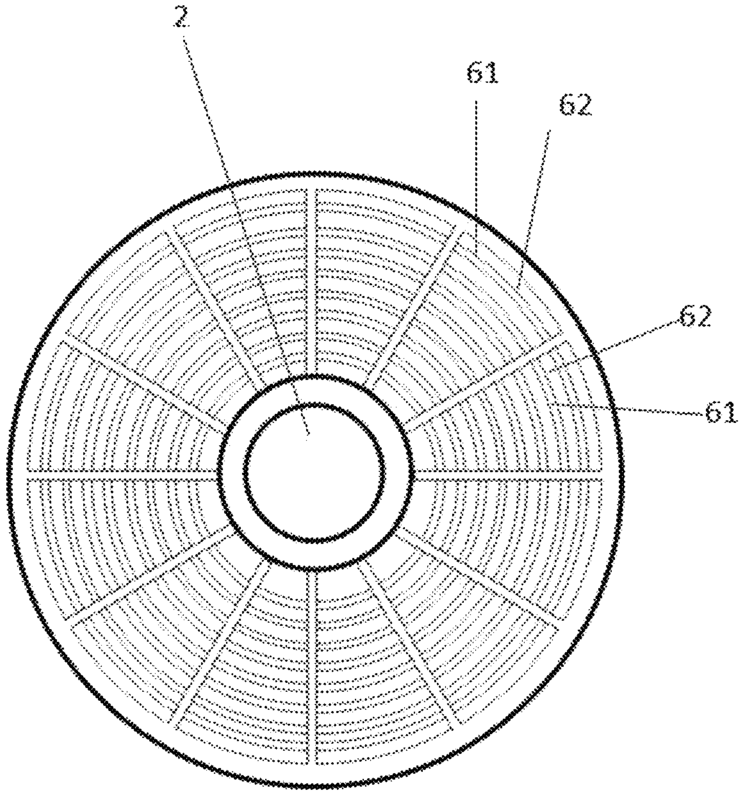
FIG. 4 is a top view of movable fluted disc of the instant dissolving device by mass transfer and stretching with a cleaning structure in the embodiment of the present invention.

FIG. 4 shows the top view of the movable fluted disc of the instant dissolving device by mass transfer and stretching with a cleaning structure. The movable fluted disc (6) is driven by the transmission shaft (2). The incompletely dissolved polymer particles are crushed by the short tooth structure (62) to form swelling particles with larger surface area and flow out of the through hole (61).

Figure 5:
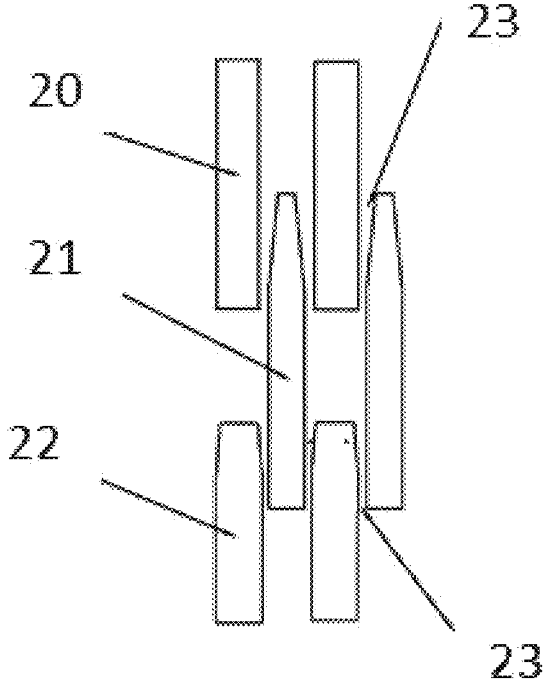
FIG. 5 is an enlarged cross-sectional view of the short tooth structure of upper fixed fluted disc, movable fluted disc and lower fixed fluted disc of the instant dissolving device by mass transfer and stretching with a cleaning structure in the embodiment of the present invention.

FIG. 5 shows the enlarged cross-sectional view of the short tooth structures of the upper fixed fluted disc, movable fluted disc and lower fixed fluted disc of the instant dissolving device by mass transfer and stretching with a cleaning structure.

Each stretching repetition unit is set with upper fixed tooth (20) and movable tooth (21); the engagement gap between the lower fixed tooth (22) and the movable tooth (21) is consistent, that is, the engagement gap between the upper fixed fluted disc, movable fluted disc and lower fixed fluted disc of each repetition unit is the same. The stretching unit is composed of identical stretching repetition units in parallel, that is, the short tooth structure of the movable fluted disc and the lower fixed fluted disc is trapezoidal: The upper fixed tooth (20) of the upper fixed fluted disc (5) is combined with the moving tooth (21) of the movable fluted disc (6) to form a primary-stage instant dissolution structure; the upper fixed tooth (20) and the movable tooth (21) are engaged with each other, with an engagement gap (23) that is 2.45 mm at the upper inlet and 0.45 mm at the lower outlet; the engagement gap of 0.45 mm is 5 mm deep. The movable tooth (21) of the movable fluted disc (6) is combined with the lower fixed tooth (22) of the lower fixed fluted disc (7) to form a secondary-stage instant dissolution structure; the movable tooth (21) and the lower fixed tooth (22) are engaged with each other, with an engagement gap (23) that is 1.32 mm at the upper inlet and 0.15 mm at the lower outlet; the engagement gap of 0.15 mm is 5 mm deep. With the above bipolar instant dissolution structure, the dissolved particles are forcibly stretched to obtain smaller size, which is better than that with only a fixed fluted disc and a movable fluted disc; after treated by two identical stretching repetition units arranged in series, the polymer gel becomes swelling particles with small size, laying the foundation for the subsequent treatment by mass transfer unit.

Figure 6:
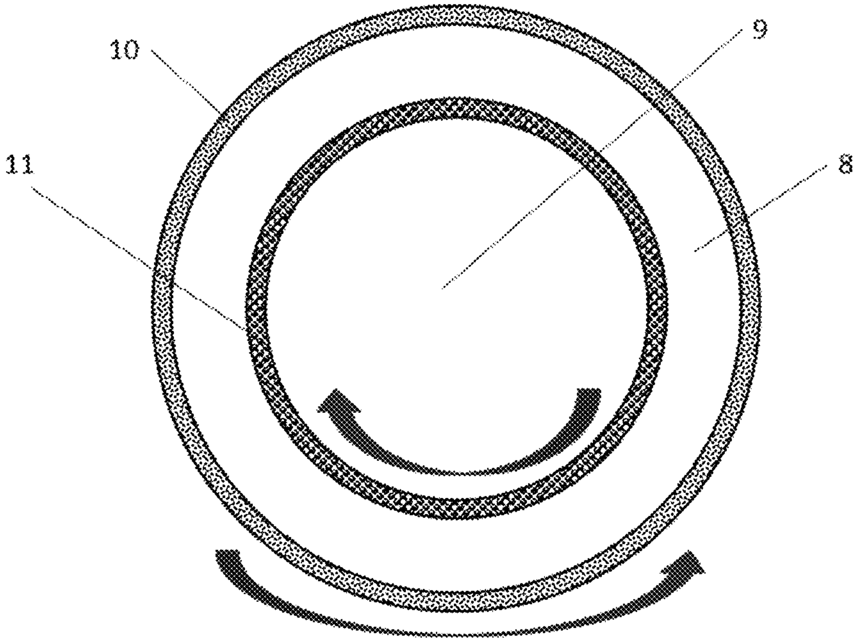
FIG. 6 is a top view of mass transfer unit of the instant dissolving device by mass transfer and stretching with a cleaning structure in the embodiment of the present invention.

FIG. 6 shows the top view of the mass transfer unit of the instant dissolving device by mass transfer and stretching with a cleaning structure; the mass transfer unit consists of mass transfer rings, which is divided into an inner ring (11), an outer ring (10), a cavity (9) of the inner ring containing the polymer, and a space (8) between the inner ring and the outer ring; the outer ring and the inner ring rotate in reverse, and porous materials are provided between the inner ring and the outer ring; when the polymer gel passes through the inner ring and the outer ring, it is stretched through the porous materials and formed a "uniform" polymer solution more quickly.

The specific method is described as follows: The swelling particles treated by the stretching unit enter the inner ring cavity (9) of the mass transfer unit; driven by the rotation of the inner ring (11), the swelling polymer particles are thrown out in the radial direction under the action of hyper-gravity centrifugation, then pass through the porous material set on the inner ring (11) and encounter the outer ring (10) with reverse rotation which is set in the space (8) between inner ring (11) and outer ring (10); the swelling particles are pulled back and forth by the reverse rotation of the outer ring (10); the polymer molecular chain segments are rapidly stretched and continually centrifuged through the porous material set on the outer ring (10) under the high gravity generated by the outer ring rotation, and the liquid comes out from the side of the outer ring (10), then is connected to the outlet (13) of the device through the channel (12), and discharged from the device to form a dissolved "uniform" polymer solution.

Figure 7:
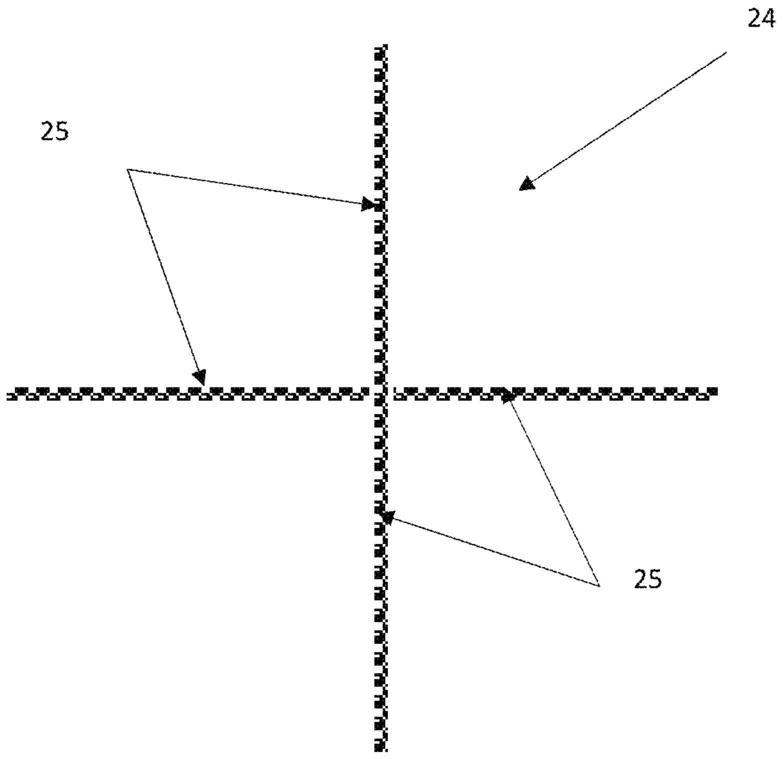
FIG. 7 is a schematic diagram of cleaning unit of the instant dissolving device by mass transfer and stretching with a cleaning structure in the embodiment of the present invention.

FIG. 7 shows a schematic diagram of the cleaning structure of the instant dissolving device by mass transfer and stretching with a cleaning structure which is provided with wave-shaped or serrated crosswise blade (25); the cleaning unit (24) is connected to the transmission shaft (2) and rotates in the opposite direction to the movable fluted disc (6) of the stretching unit through a coaxial reverser to remove the polymer gel adhering to the lower fixed fluted disc (7) and tangentially scrap off the polymer.

Figure 8:
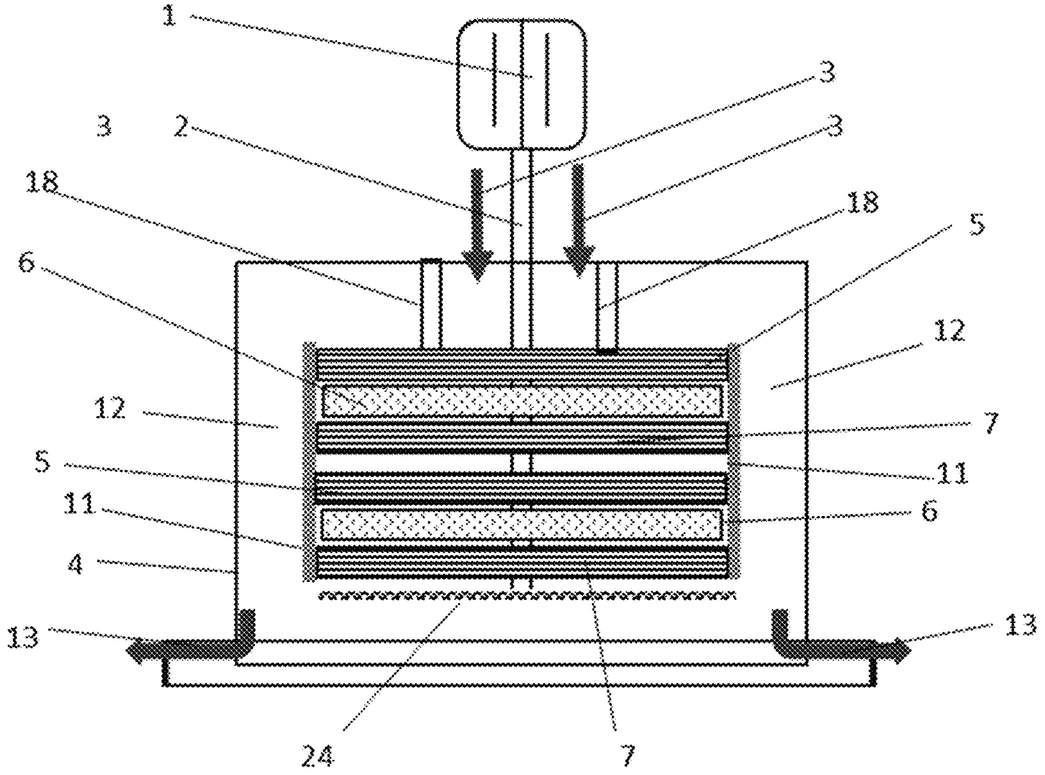
FIG. 8 is a special structural diagram of the instant dissolving device by mass transfer and stretching with a cleaning structure in the embodiment of the present invention.

FIG. 8 shows another structure diagram of the present invention. An instant dissolving device by mass transfer and stretching with a cleaning structure consists of a liquid inlet (3), a stretching repetition unit and a mass transfer unit; the stretching unit is composed of an upper fixed fluted disc (5), a movable fluted disc (6) and a lower fixed fluted disc (7) all with a plurality of through holes; the upper fixed fluted disc (5) and the lower fixed fluted disc (7) are fixed to the dissolving device housing (4); the surface of the upper fixed fluted disc (5) and the lower fixed fluted disc (7) close to the movable fluted disc (6) is of a short tooth structure, and is evenly engaged with the short tooth structure on both sides of the movable fluted disc (6); the stretching repetition units are repeatedly set from top to bottom, the upper fixed fluted disc (5) is fixed to the device housing (4) by the fixing rod (18), and the lower fixed fluted disc (7) is fixed on the device housing (4) by the another fixing rod (17). The stretching unit also includes the transmission shaft (2) and the motor (1), where in the transmission shaft (2) is connected to the movable fluted disc (6) and the motor (1) drives the movable fluted disc (6) to rotate. A cleaning unit (24) is arranged below the stretching unit and connected with the transmission shaft (2), and rotates in the opposite direction to the movable fluted disc (6) of the stretching unit through a coaxial reverser to remove the polymer gel adhering to the lower fixed fluted disc (7) and tangentially scrap off the polymer.

Mass transfer units are arranged in the periphery of the stretching unit. The mass transfer unit is a single-layer mass transfer ring (11) that is connected to the stretching unit. The mass transfer ring (11) is directly connected to the outer ring walls of the upper and lower fixed fluted discs of the stretching unit, forming an integrated cylinder with the stretching unit. The mass transfer ring (11) is kept stationary as the upper and lower fixed fluted discs; porous materials are arranged on the mass transfer ring (11); the polymer reaches the inner side of the mass transfer ring through the stretching unit under the action of centrifugal force, and forced to pass through the mass transfer ring (11); the polymer molecular chain segment is rapidly extended and the polymer gel is formed into a "uniform" solution after passing through the mass transfer unit, and the solution is connected with the polymer outlet (13) set at the lower part of the mass transfer unit through the channel (12); a polymer inlet (3) is set at the upper part of the stretching unit, and polymer gel scraped off by the cleaning unit (24) directly enters the discharge device at the outlet (13).

A liquid inlet is added to the interval between the stretching repetition units in order to meet greater liquid dispensing requirement.

In use, firstly start the motors of the device to drive the movable fluted disc (6) and cleaning unit (24) to rotate; pump a mixture of dry polymer powder and water from the liquid inlet (3); fill the aqueous solution of the incompletely dissolved polymer into each stretching unit from the liquid inlet (3) for stretching; the aqueous solution of the polymer sequentially enters the upper fixed fluted disc (5) and the movable fluted disc (6) from the through holes on the upper fixed fluted disc (5), and then enters the lower fixed fluted disc (7) from the movable fluted disc (6); due to the short tooth structure of the upper fixed fluted disc (5), the movable fluted disc (6) and the lower fixed fluted disc (7), the short tooth structure of the movable fluted disc (6) and the lower fixed fluted disc (7) is in a tooth shape, and the mass transfer repetition units are repeatedly arranged from top to bottom; the engagement gap between the upper fixed fluted disc (5) and the movable fluted disc (6) and between the movable fluted disc (6) and the lower fixed fluted disc (7) in each mass transfer unit is gradually reduced from top to bottom; the movable fluted disc (6) runs at a certain speed, and the incompletely dissolved polymer particles are crushed by the short tooth structure to form swelling particles with larger surface area; the swelling particles are centrifuged to the inner side of the mass transfer ring (11) of the mass transfer unit by the centrifugal force of the stretching unit and forced to pass through the mass transfer ring (11); the polymer molecular chain segment is rapidly extended and the polymer gel is formed into a "uniform" solution after passing through the mass transfer unit, and the solution is connected with the polymer outlet (13) set at the lower part of the mass transfer unit through the channel (12); a polymer inlet (3) is set at the upper part of the stretching unit, and the polymer gel scraped off by the cleaning unit (24) directly enters the discharge device at the outlet (13).

With the disclosure of the above embodiments, those skilled in the art can adopt the different numbers of stretching repetition units, the different setting methods of mass transfer ring and the different numbers of combined devices as needed, all of which fall within the protection scope of the present invention and will not be detailed herein.

Comparative Example

For the Comparative Example, the efficient polymer preparation device and the assembly method thereof disclosed in CN110860250A are adopted, with the technical solution described as follows:

The invention discloses an efficient polymer preparation device and an assembly method thereof, including an input manifold, a tubular dissolving device for a forced polymer stretching, an output manifold and a multistage mass transfer and deepening instant polymer dissolving device, wherein the tubular dissolving device for a forced polymer stretching comprises a motor, an upper end seat, a tubular dissolution housing, a lower end seat, a transmission shaft arranged axially in the tubular dissolution housing, and a plurality of dissolution units arranged in parallel in the tubular dissolution housing; the motor is axially arranged on the upper end seat and connected to the transmission shaft; the input and the output manifolds are both closed at one end and open at the other end; the open end of the output manifold is connected with the multistage mass transfer and deepening instant polymer dissolving device, and a polymer outlet is provided on the multistage mass transfer and deepening instant polymer dissolving device. Featured by simple installation, high processing capacity, light weight, small footprint, the preparation device can effectively accelerate polymer dissolution and can be used in polymer oil drive technology on offshore platforms.

Please refer to the CN110860250A document for specific structure, because there is an efficient polymer preparation device recorded in CN110860250A document, specifically a forced stretching dissolving device mounted with a multistage mass transfer device. However, its multistage mass transfer device is fundamentally different from that in the present application, and its mass transfer ring cannot rotate, whereas the mass transfer ring in the present application can rotate in the opposite direction to that of the movable fluted disc near the stretching movable fluted disc, the outer ring of the mass transfer ring rotates in the opposite direction to the inner ring, all adjacent mass transfer rings rotate in the opposite direction to each other, and the stretching unit and mass transfer unit are set together, so that the polymer particles brought out by the rotation in the stretching unit can quickly dissolve the polymer evenly under the pulling effect of the reverse rotation of the mass transfer ring. As for the efficient polymer preparation device described in prior art CN110860250A, the stretching device is separated from the mass transfer device, which cannot provide a better synergistic effect; moreover, the mass transfer ring cannot rotate, and adjacent mass transfer rings cannot rotate in the opposite direction, resulting in a slower polymer dissolution velocity. In a case study of AP-P4 polymer, taking water quality of SZ36-1 reservoir in Bohai Sea as reference:

With the same volume, when the preparation concentration of the present application is 2,000 mg/L, the preparation speed is twice as fast as that of the Comparative Example.

According to the preparation and injection requirements, the maximum preparation concentration in the present application can be 20,000 mg/L in case of constant preparation speed and equivalent device volume.

However, in the Comparative Example, the maximum preparation concentration is only 5,000 mg/L in case of constant preparation speed and equivalent device volume.

Therefore, in the present application, after ground by the stretching movable fluted disc, the polymers are thrown out to contact the reversely rotating mass transfer ring directly, and then the polymers are dispersed quickly under the pulling force generated by reverse rotation. Moreover, the adjacent mass transfer rings are rotating reversely and continually pulling in the reversely rotating space to quickly disperse the polymers into a uniform solution, which is a technical solution unavailable in the prior art and completely different from the prior art, making great progress.

To sum up, disclosed are an instant dissolving device by mass transfer and stretching with a cleaning structure and a dissolving method thereof, wherein the device consists of a liquid inlet, a stretching repetition unit and a mass transfer unit; the stretching unit is sequentially composed of an upper fixed fluted disc, a movable fluted disc and a lower fixed fluted disc all with a plurality of through holes; the upper fixed fluted disc and the lower fixed fluted disc are fixed to the dissolving device housing; the surface of the upper and lower fixed fluted discs close to the movable fluted disc is of a short tooth structure, and is evenly engaged with the short tooth structure on both sides of the movable fluted disc; the stretching unit is repeatedly set from top to bottom in series, and also provided with a transmission shaft and a motor; a cleaning structure is set below the stretching unit and a mass transfer unit is set around the periphery of the stretching unit; the mass transfer unit comprises a mass transfer ring that can rotate reversely around the same axis; the polymer gel is formed into a "uniform" solution after passing through the mass transfer unit. The dissolving device in the present invention is easy to install, and achieves instant dissolution of the polymers and improves the dissolution efficiency through the joint action of forced stretching and mass transfer by high gravity.

The above are not intended to limit the present invention in any form. Although the present invention has been disclosed as above with preferred embodiments, it is not intended to limit the present invention. Those skilled in the art, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention are still regarded as a part of the technical solution of the present invention.

What is claimed is:

1. An instant dissolving device by mass transfer and stretching with a cleaning structure, consisting of a housing, a liquid inlet, a stretching repetition unit, a mass transfer unit, a cleaning unit and a liquid outlet; the stretching repetition unit, the mass transfer unit and the cleaning unit are arranged inside the housing, and the liquid inlet and the liquid outlet are provided on the housing; a polymer solution flowing from the stretching repetition unit or the mass transfer unit is connected to a polymer outlet provided in a lower part of the mass transfer unit through a channel;

the stretching repetition unit is sequentially composed of an upper fixed fluted disc, a movable fluted disc and a lower fixed fluted disc all with a plurality of through holes; the upper fixed fluted disc and the lower fixed fluted disc are fixed to a transmission shaft or the housing; a surface of the upper fixed fluted disc and the lower fixed fluted disc close to the movable fluted disc is of a short tooth structure, and is evenly engaged with a short tooth structure on both sides of the movable fluted disc; a diameter of the fixed fluted disc is less than a diameter of the movable fluted disc, and the stretching repetition unit is repeated in series from top to bottom, and also provided with the transmission shaft and a motor; a number of stretching repetition units is defined as n ($n \geq 1$);

the cleaning unit is arranged below the stretching repetition unit and connected with the transmission shaft, and rotates in opposite direction of the movable fluted disc of the stretching repetition unit through a coaxial reverser to clean the polymer solution adhered to the lower fixed fluted disc; the cleaning unit is arranged below each stretching repetition unit or below an entire stretching unit, and a bottom plate of the mass transfer unit is kept a certain distance from the lower fixed fluted disc, so as to store the polymer solution scraped off by the cleaning unit;

the mass transfer unit is arranged around a periphery of the stretching repetition unit; the polymer solution enters the mass transfer unit after being processed by the stretching repetition unit; the mass transfer unit is composed of k layer(s) of a mass transfer ring ($k=3$); a porous material is provided on a side of the mass transfer ring, and the polymer solution passes through the porous material provided on the mass transfer ring for transfer by shearing and flows out of the mass transfer ring which is combined with the stretching repetition unit; the mass transfer ring is movably arranged on the housing, the transmission shaft of the stretching repetition unit, or an external motor;

if set in combination with the stretching repetition unit, the mass transfer ring is first directly connected to an outer ring wall of upper and lower fixed fluted discs of the stretching repetition unit, forming an integrated cylinder with the stretching repetition unit; the mass transfer ring is kept stationary as the upper and lower fixed fluted discs, and rest of mass transfer rings are set apart from the stretching repetition unit and rotated by the coaxial reverser or a separate motor in an axis of the transmission shaft of the stretching repetition unit; adjacent separated mass transfer rings all rotate in the opposite direction, and an innermost separated mass transfer ring rotates in the opposite direction to the movable fluted disc of the stretching repetition unit; the bottom plate is arranged under a speared mass transfer ring, and a space is left in a horizontal direction between the adjacent mass transfer rings, so that the polymer solution is pulled in the opposite direction in different mass transfer rings; and if k is 3, the mass transfer ring is set in combination with the stretching repetition unit and is divided into a fixed ring, an inner separated ring and an outer separated ring; the fixed ring is directly connected with the outer ring wall of the upper and lower fixed fluted discs of the stretching repetition unit, forming the integrated cylinder with the stretching repetition unit, that is, the mass transfer ring is fixed on the outer ring wall of the upper and lower fixed fluted discs of the stretching repetition unit; at this time, the fixed ring of the mass transfer ring rotates in a same direction as the movable fluted disc of the stretching repetition unit; the inner separated ring and the outer separated ring are arranged separately; separated mass transfer rings are rotated by the coaxial reverser or the separate motor in the axis of the transmission shaft of the stretching repetition unit; the inner separated ring is rotated by the coaxial reverser or the separate motor in the opposite direction to the movable fluted disc of the stretching repetition unit; the outer separated ring is rotated by the coaxial reverser or the separate motor in the opposite direction to the inner separated ring; the bottom plate is set under each separated mass transfer ring, and a spacing is left horizontally between the adjacent mass transfer rings, so that the polymer solution is pulled in the opposite direction in the different mass transfer rings.

2. The instant dissolving device according to claim 1, wherein the movable fluted disc is of the short tooth structure, and the short tooth structure is 3 to 5 cm in length, and the short tooth structure is designed with circular transition; the short tooth structure of the movable fluted disc and the lower fixed fluted disc is in a tooth shape, and the stretching repetition unit is repeatedly arranged in series from top to bottom; the transmission shaft is connected to the movable fluted disc, and the motor drives the movable fluted disc to rotate; an engagement gap between the upper fixed fluted disc and the movable fluted disc and between the movable fluted disc and the lower fixed fluted disc in each mass transfer unit is gradually reduced from the top to bottom.

3. The instant dissolving device according to claim 1, wherein a liquid inlet is added to an interval between the stretching repetition unit in order to meet greater liquid dispensing requirement.

4. The instant dissolving device according to claim 1, wherein the liquid inlet is connected with the stretching repetition unit, the liquid inlet is arranged on an upper part of the stretching repetition unit, and the liquid outlet is arranged on a lower part of the housing; the transmission shaft is connected to an upper motor outside the housing.

5. The instant dissolving device according to claim 1, wherein the porous material is sand particle with different meshes, metal foam with different pore sizes, screen meshes with different pore sizes, or one or more of cellulose.

6. The instant dissolving device according to claim 1, wherein the cleaning unit is a crosswise blade with a wave shape or serrated structure.

7. A method of dissolving polymers using the instant dissolving device according to claim 1, comprising following steps:

firstly, start motors of the device to drive the mass transfer rings of the stretching repetition unit, the cleaning unit and the mass transfer unit to rotate; pump in a mixture of dry polymer powder and water from the liquid inlet; undissolved polymer mixed solution enters an upper part of the stretching repetition unit from the liquid inlet for stretching; the polymer solution passes through the stretching repetition unit and enters the upper fixed fluted disc and the movable fluted disc from the plurality of through holes on the upper fixed fluted disc, and then flows from the movable fluted disc into the lower fixed fluted disc; due to the short tooth structure of the upper fixed fluted disc, the movable fluted disc and the lower fixed fluted disc, the short tooth structure of the movable fluted disc and the lower fixed fluted disc is in a tooth shape, and the stretching repetition unit is repeatedly arranged in series from top to bottom; an engagement gap between the upper fixed fluted disc and the movable fluted disc and between the movable fluted disc and the lower fixed fluted disc in each of the stretching repetition unit is gradually reduced from the top to bottom, the movable fluted disc runs at a certain speed, swelling polymer particles are ground by the short tooth structure, then sheared again by a tangential force generated in the stretching repetition unit under a centrifugal force, and centrifuged to the mass transfer rings of the mass transfer unit:

the mass transfer rings are set in combination with the stretching repetition unit, the polymer solution is treated by the stretching repetition unit and then forced to pass through the mass transfer rings, penetrate the porous material of the mass transfer rings, and flow out the mass transfer rings into the innermost ring that is set apart; the polymer solution passes through the porous material set on the innermost ring under the action of centrifugation; due to the reverse rotation in a spacing cavity between the innermost ring and a second ring, the polymer is forcibly pulled back and forth, then comes to and penetrate the second ring under the action of high gravity; the polymer solution is forcibly pulled back and forth between second and third mass transfer rings to make polymer molecular chain segments extended rapidly and transfer out from the third mass transfer ring, until it passes through all the mass transfer rings; liquid comes from a side of the mass transfer ring, and discharged from the device to form a dissolved uniform polymer solution.

* * * * *